US010277162B1

(12) United States Patent
Atia et al.

(10) Patent No.: US 10,277,162 B1
(45) Date of Patent: Apr. 30, 2019

(54) MOUNTING APPARATUS TO SECURE A SOLAR PANEL RAIL TO STONE-COATED METAL TILE ROOFS

(71) Applicants: Moti Atia, North-Hollywood, CA (US); Netanel Yoshua Levi, North Hollywood, CA (US)

(72) Inventors: Moti Atia, North-Hollywood, CA (US); Netanel Yoshua Levi, North Hollywood, CA (US)

(*) Notice: Subject to any disclaimer, the term of this patent is extended or adjusted under 35 U.S.C. 154(b) by 0 days.

(21) Appl. No.: 15/679,048

(22) Filed: Aug. 16, 2017

Related U.S. Application Data

(63) Continuation-in-part of application No. 15/667,421, filed on Aug. 2, 2017, now Pat. No. 9,954,479, and a continuation-in-part of application No. 15/667,454, filed on Aug. 2, 2017, now Pat. No. 10,236,821, and a continuation-in-part of application No. 15/667,474, filed on Aug. 2, 2017.

(60) Provisional application No. 62/375,763, filed on Aug. 16, 2016.

(51) Int. Cl.
*H02S 20/23* (2014.01)
*F24S 25/35* (2018.01)
*F24S 25/636* (2018.01)

(52) U.S. Cl.
CPC ............. *H02S 20/23* (2014.12); *F24S 25/35* (2018.05); *F24S 25/636* (2018.05)

(58) Field of Classification Search
CPC .......... H02S 20/23; F16M 13/02; E04D 13/00

USPC ...... 52/173.3, 712, 656.1, 714, 26; 248/200, 248/237
See application file for complete search history.

(56) References Cited

U.S. PATENT DOCUMENTS

| 8,122,648 | B1* | 2/2012 | Liu ....................... F24S 25/61 52/58 |
| 8,387,319 | B1* | 3/2013 | Gilles-Gagnon ..... F24S 25/615 52/173.3 |
| 8,689,517 | B2 | 4/2014 | Schaefer |
| 8,756,881 | B2* | 6/2014 | West ....................... E04B 1/38 52/173.3 |
| 8,806,815 | B1* | 8/2014 | Liu ..................... H01L 31/0422 52/173.3 |
| 8,904,730 | B2* | 12/2014 | Hohmann, Jr. ....... E04B 1/4178 52/379 |
| 8,938,932 | B1* | 1/2015 | Wentworth ............ H02S 20/23 52/747.1 |
| 9,577,571 | B2* | 2/2017 | Atia ....................... H02S 20/23 |

(Continued)

*Primary Examiner* — Terrell L McKinnon
*Assistant Examiner* — Michael McDuffie
(74) *Attorney, Agent, or Firm* — Plager Schack LLP; Mark H. Plager; Eric Liou

(57) ABSTRACT

A mounting apparatus to secure a solar panel rail to a metal tile roof and minimize penetrations or damage to a rafter of the roof positioned below a plurality of metal tiles is provided. The mounting apparatus permits the solar panel rail to support a solar panel thereon. The mounting apparatus includes a lower assembly coupled to the metal tile roof and having a threaded screw and flashing disposed on a metal tile and coupled together, and an upper arm assembly coupled to the threaded screw of the lower assembly, the upper arm assembly having a generally L-shaped member having a slot to receive a fastener that secures the solar panel rail thereto, thereby permitting the mounting apparatus to support the solar panel rail above the metal tile roof.

11 Claims, 3 Drawing Sheets

(56) References Cited

U.S. PATENT DOCUMENTS

| | | | |
|---|---|---|---|
| 2009/0019796 A1* | 1/2009 | Liebendorfer | F24J 2/5207 52/173.3 |
| 2011/0179727 A1* | 7/2011 | Liu | H02S 20/25 52/173.3 |
| 2012/0222380 A1* | 9/2012 | Wentworth | E04D 13/1407 52/698 |
| 2012/0233958 A1* | 9/2012 | Stearns | E04D 13/10 52/708 |
| 2013/0009025 A1* | 1/2013 | Stearns | E04D 13/10 248/237 |
| 2013/0292531 A1* | 11/2013 | Schaefer | E04C 3/06 248/237 |
| 2013/0299655 A1* | 11/2013 | Sader | F24J 2/5205 248/231.9 |
| 2015/0143760 A1* | 5/2015 | Daniels | E04D 13/00 52/173.1 |
| 2015/0222225 A1* | 8/2015 | Danning | B23P 11/00 248/237 |
| 2016/0111995 A1* | 4/2016 | Nayar | H02S 20/23 211/41.1 |
| 2016/0134230 A1* | 5/2016 | Meine | H02S 20/23 52/698 |
| 2017/0063287 A1* | 3/2017 | Hudson | H02S 20/23 |
| 2017/0063300 A1* | 3/2017 | Ash | F24S 25/61 |
| 2017/0104442 A1* | 4/2017 | MacRostie | H02S 20/23 |
| 2017/0107723 A1* | 4/2017 | Stearns | E04D 13/00 |
| 2017/0302221 A1* | 10/2017 | Jasmin | F24S 25/00 |

\* cited by examiner

US 10,277,162 B1

MOUNTING APPARATUS TO SECURE A SOLAR PANEL RAIL TO STONE-COATED METAL TILE ROOFS

RELATED APPLICATION

The application claims priority to provisional patent application U.S. Ser. No. 62/375,763 filed on Aug. 16, 2016, the entire contents of which is herein incorporated by reference. The application claims priority to non-provisional patent application U.S. Ser. No. 15/667,474 filed on Aug. 2, 2017, the entire contents of which is herein incorporated by reference. The application claims priority to non-provisional patent application U.S. Ser. No. 15/667,421 filed on Aug. 2, 2017, the entire contents of which is herein incorporated by reference. The application claims priority to non-provisional patent application U.S. Ser. No. 15/667,454 filed on Aug. 2, 2017, the entire contents of which is herein incorporated by reference.

BACKGROUND

The embodiments herein relate generally to mounting apparatuses used to secure a solar panel rail to a roof. More specifically, embodiments of the invention relate to a mounting apparatus used to secure a solar panel rail to stone-coated metal tile roofs.

Solar panels are generally positioned adjacent to each other and secured to the building's roof by rails and fasteners. In many instances, each solar panel is secured within a frame that is coupled to the building's roof by a plurality of solar panel rails and mounting devices. Each solar panel rail is mechanically fastened to a mounting device, which is coupled to a rafter of the roof by mechanical fasteners such as screws or bolts.

Current solar panel rail mounting devices are designed to support a single rail. Since each solar panel rail is coupled to a separate mounting device, the number of total penetrations into the roof's rafters by mechanical fasteners is increased. These added penetrations into the roof increase the amount of labor required to install the solar panels on the roof, the chance of leakage in the roof from precipitation, and likelihood of damage suffered by the roof's structural elements such as the rafters and/or other components.

Another challenge in installing solar panel rail mounting devices to the roof include properly sealing any penetrations in the roof's components such as the rafters to prevent leaks into the building from precipitation. A variety of roof mount sealing assemblies are disclosed in U.S. Pat. No. 8,689,517. However, these assemblies comprise complicated components to install and/or a limited seal around the penetrations into the roof.

As such, there is a need in the industry for a mounting apparatus that overcomes the limitations of the prior art, which permits the attachment of a solar panel rail to stone-coated metal tile roofs. There is a further need for the mounting apparatus to support a solar panel rail thereon in a manner that minimizes the amount of penetration and/or damage to the roof upon installation. There is a further need for the mounting apparatus to allow an improved and complete seal installation without modifying the structure of the roof.

SUMMARY

A mounting apparatus to secure a solar panel rail to a metal tile roof and minimize penetrations or damage to a rafter of the roof positioned below a plurality of metal tiles is provided. The mounting apparatus is configured to permit the solar panel rail to support a solar panel thereon. The mounting apparatus comprises a lower assembly coupled to the metal tile roof and comprising a threaded screw and a flashing, the threaded screw disposed through the rafter and extending through one of the metal tiles to a position above the roof, the flashing comprising a plate disposed on the one of the metal tiles and comprising a central opening to permit the threaded screw to extend therethrough, and an upper arm assembly coupled to the threaded screw of the lower assembly, the upper arm assembly comprising a generally L-shaped member comprising a slot configured to receive a fastener that secures the solar panel rail thereto, thereby permitting the mounting apparatus to support the solar panel rail above the metal tile roof.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figure 1:
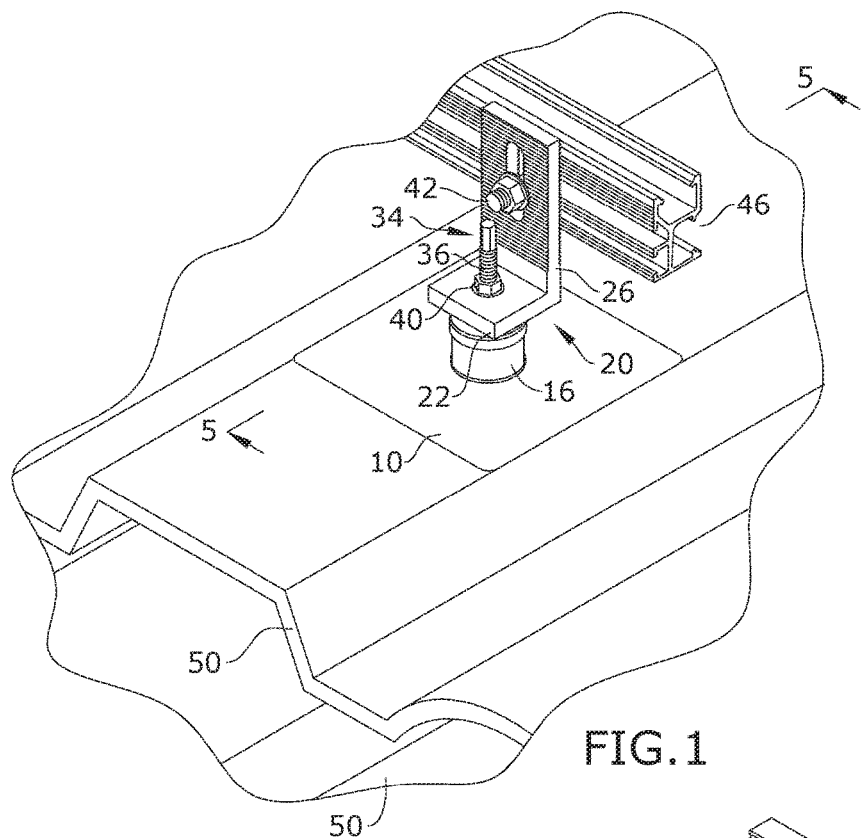
FIG. 1 depicts a perspective view of certain embodiments of the mounting apparatus shown in use.
Figure 2:
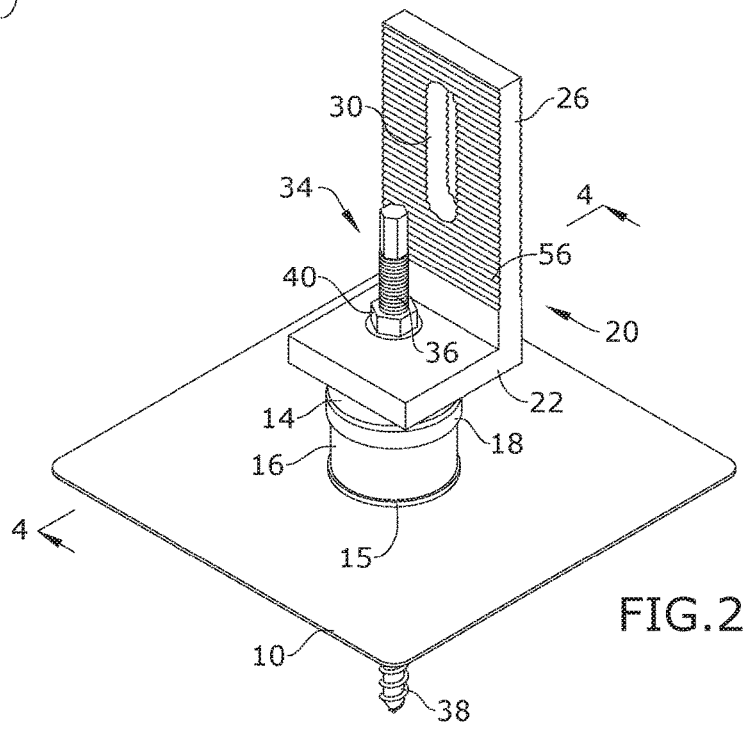
FIG. 2 depicts a perspective view of certain embodiments of the mounting apparatus.
Figure 3:
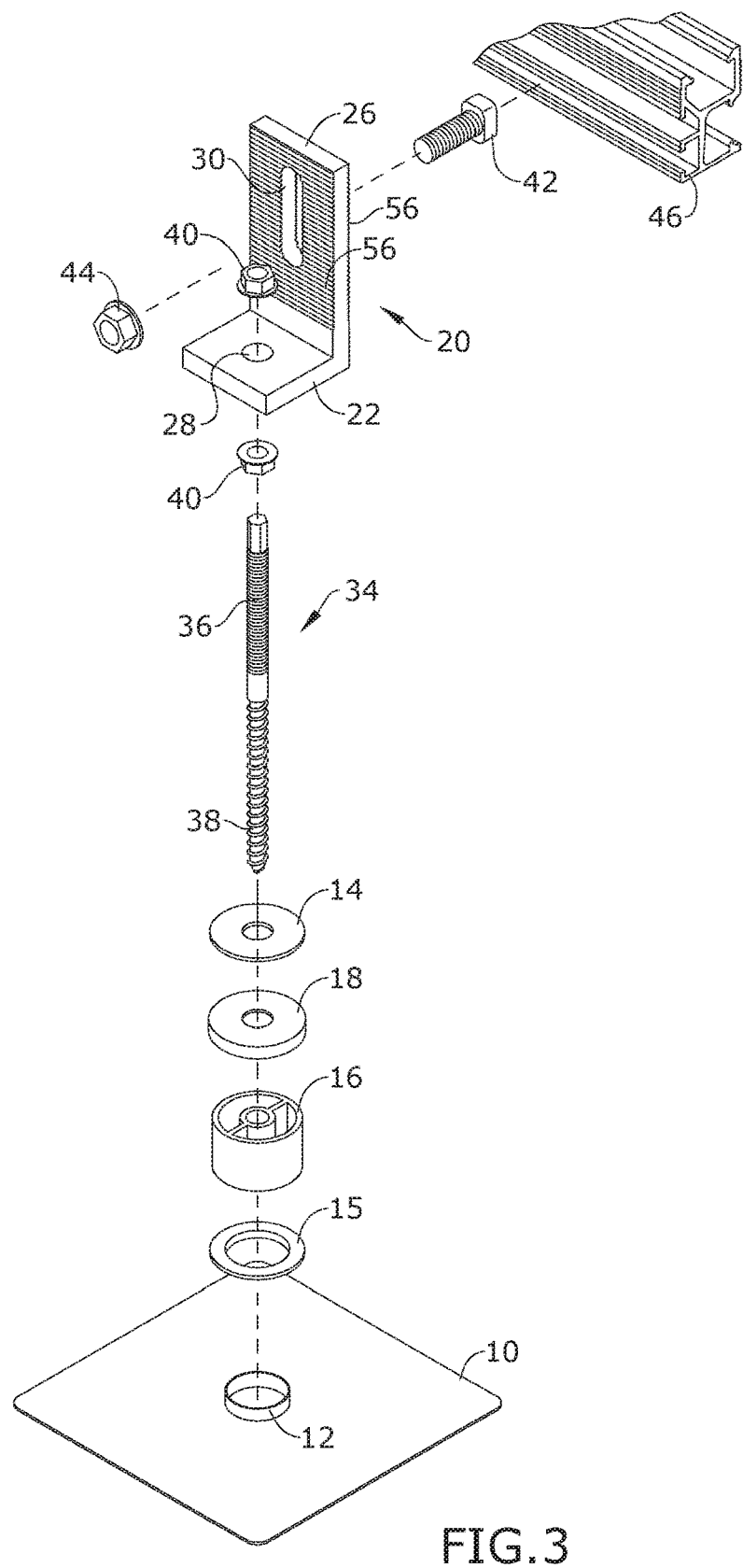
FIG. 3 depicts an exploded view of certain embodiments of the mounting apparatus.

As depicted in FIGS. 1-3, the mounting apparatus is configured to secure solar panel rail 46 above a roof comprising a plurality of metal tiles 50. Metal tiles 50 are preferably stone-coated. However, the mounting apparatus may be used with alternative metal tiles or types of roof tiles.

In one embodiment, solar panel rail 46 is designed to support a side portion or intermediate portion of the solar panel (not shown). In certain embodiments, the solar panel is disposed within a frame (not shown) that is secured to solar panel rail 46 by a fastener such as a clamp, bolt, or the like. It shall be appreciated that the solar panel may be coupled to one or more additional rails throughout the panel to provide additional support when securing the solar panel to the roof.

Figure 4:
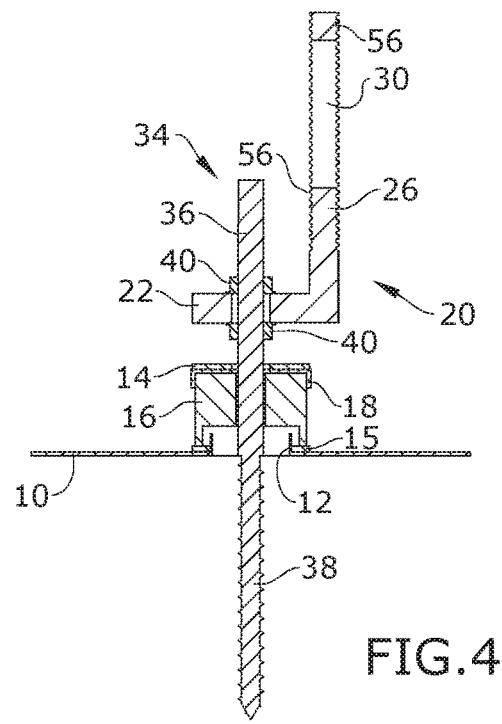
FIG. 4 depicts a section view of certain embodiments of the mounting apparatus taken along line 4-4 in FIG. 2.
Figure 5:
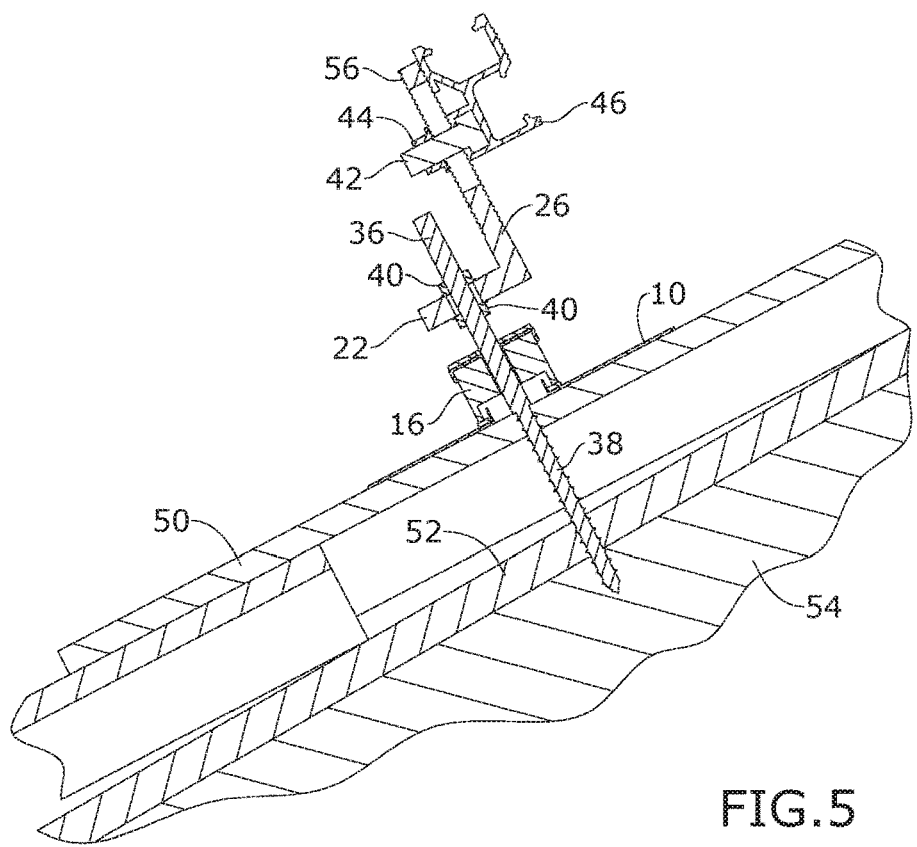
FIG. 5 depicts a section view of certain embodiments of the mounting apparatus taken along line 5-5 in FIG. 1.

In certain embodiments, the mounting apparatus generally comprises a lower assembly coupled to the metal tile roof and upper arm assembly 20 coupled to the lower assembly. As depicted in FIGS. 3-5, the lower assembly comprises flashing 10, lower washer 15, post member 16, cap 18, upper washer 14 and hanger bolt 34. The lower portion of hanger bolt 34 secures the lower assembly to the metal tile roof. The upper portion of hanger bolt 34 secures upper arm assembly 20 to the lower assembly.

Hanger bolt 34 is preferably made from stainless steel and comprises machine threaded bolt section 36 and lag threaded bolt section 38. Lag threaded bolt section 38 of hanger bolt 34 is configured to be disposed through metal tiles 50, weatherproof layer 52 and rafter 54 of the roof.

Flashing 10 comprises a plate with a central opening configured to receive lag threaded bolt section 38 of hanger bolt 34. In one embodiment, flashing 10 comprises flange 12 coupled to the central opening of the plate. Lower washer 15 is preferably made from silicone and is configured to be disposed around lag threaded bolt section 38 of hanger bolt 34 and be in contact with flashing 10. Post member 16 preferably is made from aluminum and comprises a generally cylindrical member with a central opening configured to receive lag threaded bolt section 38. Cap 18 is preferably made from aluminum and is configured to be disposed around lag threaded bolt section 38. Cap 18 is configured to couple to post member 16. Upper washer 14 is preferably made from silicone and is configured to be disposed around lag threaded bolt section 38 of hanger bolt 34. Upper washer 14 is configured to couple to cap 18.

As depicted in FIGS. 2-3, upper arm assembly 20 is preferably made from aluminum and comprises a generally L-shaped member. Specifically, the L-shaped member comprises horizontal arm 22 continuously connected to upright arm 26. Horizontal arm 22 comprises central opening 28, which is configured to receive machine threaded bolt section 36 of hanger bolt 34.

Upright arm 26 comprises slot 30, which is sufficiently large to receive T-bolt 42. T-bolt 42 is configured to be coupled to nut 44. In one embodiment, the inner and outer surfaces of upright arm 26 comprise a plurality of grooves 56 that surround slot 30.

In operation, one or more of the following steps may be performed to secure the mounting apparatus to solar panel rail 46 and the roof. First, a chalk line is generally disposed on the roof across metal tiles 50 to indicate the general location where solar panel rail 46 will be installed. An instrument such as a stud finder may be used to directly locate the position of rafter 54. Once rafter 54 is located, a ¼" pilot hole is drilled through metal tile 50, weatherproof layer 52 and rafter 54. The ¼" drilled hole is backfilled with a sealant.

As depicted in FIG. 5, hanger bolt 34 is disposed through the ¼" pilot hole such that lag threaded bolt section 38 extends through metal tile 50, weatherproof layer 52 and rafter 54. A sealant is applied to the bottom of flashing 10 prior to being disposed around hanger bolt 34. Once assembled, lag threaded bolt section 38 extends through the central opening and flange 12 of flashing 10, which is directly coupled to metal tile 50. Lower washer 15 is disposed around lag threaded bolt section 38 of hanger bolt 34 and coupled to flashing 10. Post member 16 is disposed around hanger bolt 34 and screwed in place to engage with lag threaded bolt section 38. This couples post member 16 to lower washer 15. Cap 18 is disposed around lag threaded bolt section 38 of hanger bolt 34 and coupled to the top of post member 16. Upper washer 14 is disposed around lag threaded bolt section 38 of hanger bolt 34 and coupled to cap 18.

This installation of hanger bolt 34, flashing 10, lower washer 15, post member 16, cap 18 and upper washer 14 is advantageous because it creates a complete seal of the penetration into rafter 54 of the metal tile roof without modifying the structure of the roof.

Upper arm assembly 20 is coupled to the lower assembly by sliding machine threaded bolt section 36 of hanger bolt 34 through central opening 28 of horizontal arm 22. A pair of nuts 40 is disposed around sliding machine threaded bolt section 36 to secure upper arm assembly 20 to hanger bolt 34 in the desired position. In the secured position, a first nut 40 is coupled to a bottom portion of horizontal arm 22 and a second nut 40 is coupled to a top portion of horizontal arm 22.

As depicted in FIGS. 1 and 5, solar panel rail 46 is coupled to upper arm assembly 20. Specifically, solar panel rail 46 is coupled to upright arm 26 of upper arm assembly 20 by T-bolt 42 and nut 44. T-bolt 42 extends through slot 30 in upright arm 26 and is secured in place by nut 44. Although the figures depict solar panel rail 46 coupled to the outer surface of upright arm 26, it shall be appreciated that solar panel rail 46 can alternatively be coupled to the inner surface of upright arm 26.

The mounting apparatus is beneficial because it can support solar panel rail 46 thereon while limiting the number of penetrations at a single location in rafter 54. This minimizes leaks, damage and labor/maintenance costs of the metal tile roof.

It shall be appreciated that multiple mounting apparatuses may be used to secure the solar panel rail to the roof as desired. It shall be appreciated that the components of the mounting apparatus described in several embodiments herein may comprise any alternative known materials in the field and be of any color, size and/or dimensions. It shall be appreciated that the components of the mounting apparatus described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A mounting apparatus to secure a solar panel rail to a metal tile roof and minimize penetrations or damage to a rafter of the roof positioned below a plurality of metal tiles, the mounting apparatus configured to permit the solar panel rail to support a solar panel thereon, the mounting apparatus comprising:

a lower assembly coupled to the metal tile roof and comprising a flashing, a post member and a threaded screw, the flashing comprising a plate disposed on the one of the metal tiles and comprising a central opening, the post member disposed on the flashing and comprising a partially hollow cylindrical assembly formed by an interior central tubular member coupled to an outer cylindrical tubular member by a pair of connecting tabs, the partially hollow cylindrical assembly comprising interior space within the outer cylindrical tubular member that surrounds the interior central tubular member and extends from a top end of the post member to a bottom end of the post member, the threaded screw disposed through the rafter and extending through one of the metal tiles, the central opening of the flashing and the interior central tubular member of the partially hollow cylindrical assembly to a position above the roof; and an upper arm assembly coupled to the threaded screw of the lower assembly, the upper arm assembly comprising a generally L-shaped member comprising a slot configured to receive a fastener that secures the solar panel rail thereto, thereby permitting the mounting apparatus to support the solar panel rail above the metal tile roof;

wherein the threaded screw of the lower assembly comprises a lag threaded bolt section extending through the one of the metal tiles and a machine threaded bolt section extending entirely through the upper arm assembly.

2. The mounting apparatus of claim 1, wherein the flashing of the lower assembly comprises a flange coupled to the central opening of the plate.

3. The mounting apparatus of claim 2, wherein the pair of connecting tabs of the partially hollow cylindrical assembly extends from the top end of the post member to an intermediate portion of the post member within the outer cylindrical tubular member to permit a portion of the interior space within the outer cylindrical tubular member beneath the intermediate portion of the post member to receive the flange on the flashing.

4. The mounting apparatus of claim 3, wherein the lower assembly comprises a first washer disposed around the threaded screw and in contact with the flashing.

5. The mounting apparatus of claim 4, wherein the lower assembly comprises a cap disposed around the threaded screw and coupled to the post member.

6. The mounting apparatus of claim 5, wherein the lower assembly comprises a second washer disposed around the threaded screw and coupled to the cap.

7. The mounting apparatus of claim 6, wherein the flashing of the lower assembly comprises a flange coupled to the central opening of the plate.

8. The mounting apparatus of claim 7, wherein the generally L-shaped member of the upper arm assembly comprises a central opening that receives the threaded screw therethrough.

9. The mounting apparatus of claim 8, further comprising a first nut disposed around the threaded screw and coupled to a bottom portion of the L-shaped member and a second nut disposed around the threaded screw and coupled to a top portion of the L-shaped member.

10. The mounting apparatus of claim 9, further comprising a plurality of grooves disposed on a portion of an inner surface and a portion of an outer surface of the generally L-shaped member of the upper arm assembly.

11. The mounting apparatus of claim 10, wherein the slot of the generally L-shaped member is surrounded by the plurality of grooves.

* * * * *